(12) United States Patent
Speggiorin et al.

(10) Patent No.: US 12,135,109 B2
(45) Date of Patent: Nov. 5, 2024

(54) SUPPORT HEAD FOR VIDEO/PHOTOGRAPHIC EQUIPMENT

(71) Applicant: VITEC IMAGING SOLUTIONS S.P.A., Cassola (IT)

(72) Inventors: Paolo Speggiorin, Mussolente (IT); Stelvio Zarpellon, Bassano del Grappa (IT); Marco Frasson, Onara di Tombolo (IT); Simone Echerle, Thiene (IT)

(73) Assignee: VITEC IMAGING SOLUTIONS S.P.A., Cassola (IT)

( * ) Notice: Subject to any disclaimer, the term of this patent is extended or adjusted under 35 U.S.C. 154(b) by 53 days.

(21) Appl. No.: 17/775,764

(22) PCT Filed: Nov. 10, 2020

(86) PCT No.: PCT/IB2020/060557
§ 371 (c)(1),
(2) Date: May 10, 2022

(87) PCT Pub. No.: WO2021/094908
PCT Pub. Date: May 20, 2021

(65) Prior Publication Data
US 2022/0390816 A1   Dec. 8, 2022

(30) Foreign Application Priority Data
Nov. 12, 2019   (IT) .................. 102019000020985

(51) Int. Cl.
*F16M 11/04*   (2006.01)
*G03B 17/56*   (2021.01)

(52) U.S. Cl.
CPC ......... *F16M 11/043* (2013.01); *F16M 11/041* (2013.01); *G03B 17/561* (2013.01)

(58) Field of Classification Search
CPC ...... G03B 17/56; G03B 17/561; F16M 11/04; F16M 11/041; F16M 11/043; F16M 11/048; F16M 11/126; F16M 11/2064
See application file for complete search history.

(56) References Cited

U.S. PATENT DOCUMENTS 7,658,556 B2 *   2/2010   Johnson .............. G03B 17/566
                                                   396/428
8,827,219 B2 *   9/2014   Kessler ............... F16M 11/041
                                                   396/428

(Continued)

FOREIGN PATENT DOCUMENTS

EP          2196720 A2      6/2010

*Primary Examiner* — Jonathan Liu
*Assistant Examiner* — Guang H Guan
(74) *Attorney, Agent, or Firm* — Volpe Koenig

(57) ABSTRACT

A support head for video/photographic equipment includes:
a body on which a seat is formed, which is provided to receive an attachment plate of the video/photographic equipment, and on which body a first and a second region are defined, the regions are separated by the seat,
a retaining device movable between a first position and a second position so that the attachment plate is free to enter or come out of the seat,
a locking device for locking and unlocking the attachment plate in the seat, the locking device has a control member positioned on the first region of the body,
a safety device to prevent the retaining device from accidentally moving from the first position to the second position, and
an unlocking element of the safety device to allow the movement of the retaining device from the first to the second position, on the second region of the body.

11 Claims, 3 Drawing Sheets

(56) References Cited

U.S. PATENT DOCUMENTS

| | | | | |
|---|---|---|---|---|
| 9,568,281 B1* | 2/2017 | Chen | ............... | F41A 23/10 |
| 9,581,416 B1* | 2/2017 | Yim | ............... | F16B 2/185 |
| 9,636,785 B2* | 5/2017 | Traver | ............... | B23K 9/0286 |
| 9,752,716 B2* | 9/2017 | Guidolin | ............... | F16M 11/10 |
| 10,371,317 B2* | 8/2019 | Chen | ............... | F16M 13/022 |
| 10,533,698 B2* | 1/2020 | Zhao | ............... | F16M 11/18 |
| 11,487,190 B2* | 11/2022 | Zhu | ............... | G03B 17/561 |
| 11,703,744 B2* | 7/2023 | Chan | ............... | G03B 17/566 |
| | | | | 248/316.2 |
| 11,752,596 B2* | 9/2023 | Stabler | ............... | F16B 2/12 |
| | | | | 248/229.16 |
| 2016/0061377 A1* | 3/2016 | Nakatani | ............... | F16M 11/242 |
| | | | | 248/184.1 |
| 2022/0390816 A1* | 12/2022 | Speggiorin | ............... | G03B 17/561 |

* cited by examiner

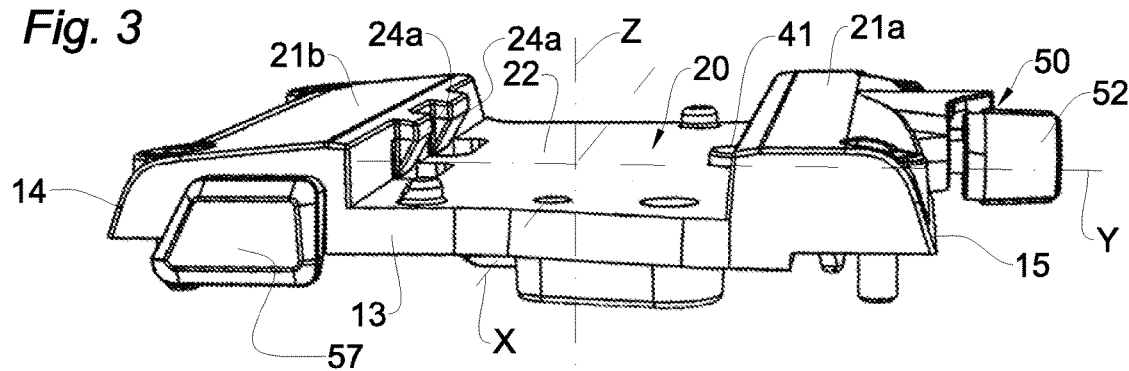
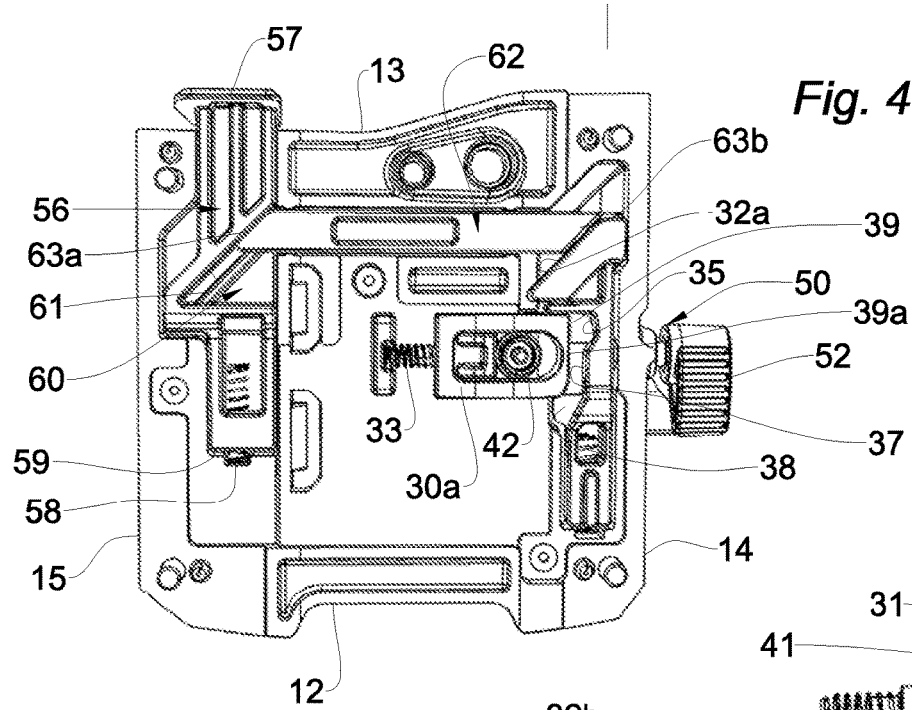
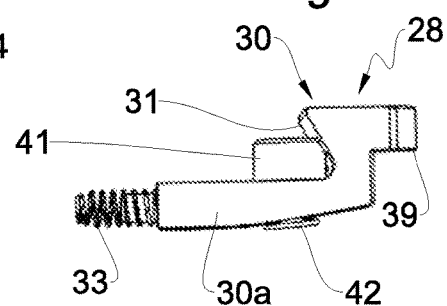
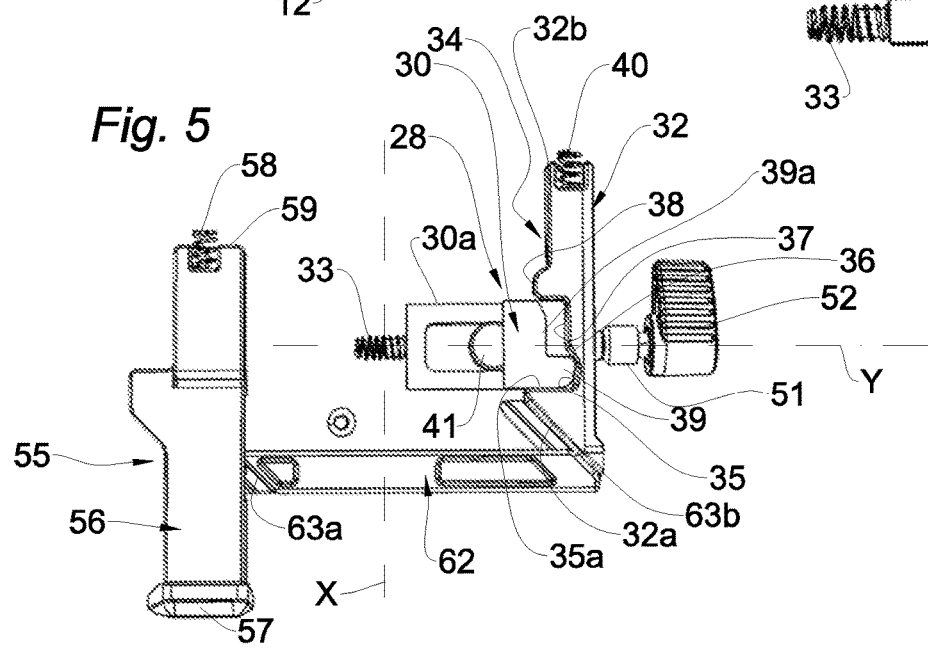

SUPPORT HEAD FOR VIDEO/PHOTOGRAPHIC EQUIPMENT

TECHNICAL FIELD

The present invention relates to a support head for video/photographic equipment. It also relates to an attachment system for video/photographic equipment comprising such a support head.

Technological Background

In the relevant technical field of the invention, attachment systems between video/photographic equipment and a support head are known and widely used. In turn, the support head may be mounted on a stand, such as a tripod.

A known attachment system typically comprises a plate which is fixed to the bottom of the equipment, and a seat formed on the support head that is capable of accommodating the plate with the ability to slide along a longitudinal direction of the plate. This feature allows the proper adjustment of the position of the equipment with respect to the support head in order to correctly balance the equipment on the head. The attachment system is also provided with a locking device arranged on the support head, capable of locking the equipment in the desired position inside the seat.

In a first known attachment system, the seat formed on the support head typically has a dovetail profile, with a support surface embedded between a pair of side guides with an inclined wall, and the support plate is inserted into the seat in a tangential manner, with a movement parallel to the support base of the seat. This operation, however, may be difficult since the insertion requires a condition of rather precise alignment between the plate and the seat and the plate is generally hidden from view, as it is placed on the bottom of the equipment.

In a second attachment system, described for example in EP 2812755 in the name of the same Applicant, the plate is inserted into the seat from above, along a direction generally perpendicular to the support surface inside the seat.

In other attachment systems, a safety device may also be provided which prevents the accidental release of the locking device which could cause the video/photographic equipment to become unbalanced and fall, with the possibility of even severe damage.

The safety device generally provides that the locking device may be released only when the user has operated a special command.

However, although the provision of the safety device significantly increases the level of safety of the attachment, it also complicates the management of the equipment release steps, proving difficult for the user.

DESCRIPTION OF THE INVENTION

The problem addressed by the present invention is that of implementing a support head for video/photographic equipment, as well as an attachment system comprising such a support head, which at least partially overcomes the limits mentioned above with reference to the cited prior art.

Within the scope of this problem, it is an object of the invention to provide a support head which is reliable, simple to manufacture and cost-effective.

This problem is solved and this object is achieved by the present invention by means of a support head and an attachment system made in accordance with the following claims.

Therefore, in a first aspect thereof, the present invention relates to a support head for video/photographic equipment, comprising:
- a body on which a seat is formed, provided to receive an attachment plate of video/photographic equipment, where the seat separates the body into a first and a second region,
- a retaining device, provided to retain the attachment plate in the seat so as to have a limited ability to slide along a longitudinal direction defined on the seat,
- a locking device, provided to lock and to unlock the plate inside the seat in a desired position, and
- a control member of the locking device, positioned on the first region of the body and operable by a user in order to control the locking device.

Preferably, the retaining device is movable between a first position, in which it extends into the seat in order to retain the attachment plate, and a second position, in which it extends less into the seat or is outside the seat so that the attachment plate is free to enter or come out of the seat along an insertion direction substantially perpendicular to the longitudinal direction.

Preferably, the support head further comprises:
- a safety device which is provided to prevent the retaining device from accidentally moving from the first to the second position, and
- an unlocking element of the safety device, positioned on the second region of the body and operable by a user to allow the movement of the retaining device from the first to the second position.

In a second aspect thereof, the present invention relates to an attachment system for video/photographic equipment, comprising an attachment plate fixable to a base of the video/photographic equipment and a support head made according to the aforementioned first aspect.

On account of these features, a support head and a corresponding attachment system is obtained in which the accidental release of the attachment plate from the support head is prevented and which, at the same time, allows convenient and quick use, especially in operations for operating the safety device.

In fact, in the support head of the present invention, the unlocking element of the safety device and the control member of the locking device are positioned on opposite sides with respect to the seat in which the attachment plate is received. In this way, the user may advantageously operate the safety device with one hand, while using the other hand to firmly hold the video/photographic equipment.

The configuration of the support head is also particularly ergonomic, thus allowing the release operations of the attachment plate from the support head to be managed in a quick, comfortable and safe manner.

In at least one of the aforementioned aspects, the present invention may also exhibit one or more of the preferred features described below.

In one embodiment, the seat is laterally delimited by a first wall and a second wall, extending substantially parallel to the longitudinal direction.

In this way, the walls act as side guides of the attachment plate when engaged in the seat with the ability to slide.

Preferably, the seat comprises a bottom, forming a support surface for the plate, recessed between the first and second walls, on which at least one end stop element is provided, designed to limit the sliding of the attachment plate along the longitudinal direction inside the seat.

Preferably, the retaining device comprises a tooth mounted on the first wall with the ability to move from and towards the inside of the seat when the retaining device is moved between the first and second position.

Preferably, the tooth has an inclined profile projecting towards the inside of the seat, with an inclined wall facing the second wall, forming an acute angle with the bottom of the seat.

Preferably, the tooth may be moved from and towards the inside of the seat by means of a translation movement.

Preferably, the tooth is movable from and towards the inside of the seat along a direction substantially perpendicular to the longitudinal direction and, more preferably, substantially parallel to the bottom of the seat.

In particular, the tooth may be moved from a retracted position, corresponding to the second position of the retaining device, to an intermediate position, corresponding to the first position of the retaining device, up to a final position, corresponding to a locking position of the attachment plate in the seat.

In the retracted position, the tooth is very close to the first wall, for example substantially flush with said wall, so as not to hinder the free entry of the attachment plate into the seat (or its free exit). Naturally, in this retracted position, the tooth may also be outside the seat.

In the intermediate position, the tooth is moved further towards the inside of the seat, so that the attachment plate cannot come out of the seat along a direction incident with the bottom of the seat.

In this position, the tooth may also touch the attachment plate, but without exerting a significant pressure thereon, so as to allow the sliding thereof (albeit limited) along the longitudinal direction.

In the final position, the tooth is moved even further towards the inside of the seat, so as to abut the attachment plate and tighten it against the second wall and/or against the bottom of the seat so as to lock the relative sliding thereof.

In one embodiment, the retaining device comprises an actuator suitably shaped to move the tooth at least from the retracted position to the intermediate position. This movement occurs when the retaining device is moved from the second position to the first position.

Preferably, the actuator is mounted with the ability to move with respect to the body and is in contact with the tooth.

Preferably, the actuator is mounted inside the body.

Preferably, the actuator may be moved by translation along a direction substantially parallel to the longitudinal direction.

In this way, when the actuator is moved, for example along the longitudinal direction, the particular shape of its profile determines a consequent movement of the tooth, for example along a direction perpendicular to the longitudinal direction.

In one embodiment, the retaining device is resiliently urged towards the first position.

In particular, it is preferred that the actuator be urged by a spring to bring the retaining device towards the first position.

Preferably, a recess is formed on the actuator for receiving the tooth when the retaining device is moved into the second position.

In one embodiment, the retaining device comprises a release element, which is movable between a position in which it locks the tooth in its retracted position, corresponding to the second position of the retaining device, and a position in which it allows the tooth to move towards the intermediate position, corresponding to the first position of the retaining device.

In this way, the retaining device may remain in the second position, overcoming the resilient action that tends to bring it into the first position.

Preferably, when the retaining device is in the second position, the release element projects from a bottom of the seat so as to abut the tooth.

Preferably, when the retaining device is in the first position, the release element is pushed towards the bottom of the seat, more preferably is substantially flush with the bottom of the seat.

In this way, the retaining device may be moved from the second position to the first position simply by pushing the release element towards the bottom of the seat. This action may be advantageously carried out by the same video/photographic equipment while it is inserted into the seat, so that, in fact, the insertion of the equipment into the seat automatically activates the retaining device which, by moving into the first position, retains the attachment plate inside the seat.

In one embodiment, the release element is resiliently urged towards the locking position of the tooth. In this way, when the attachment plate is extracted from the seat, the release element automatically returns to its tooth locking position, keeping the retaining device in the second position.

The release element is preferably shaped like a button.

In one embodiment, the locking device comprises a pin associated with the retaining device to move it from the second position towards the inside of the seat, so as to lock the attachment plate in position.

Preferably, the pin is movable with respect to the body of the head.

More preferably, the pin is movable along a direction substantially perpendicular to the longitudinal direction and, more preferably, in substantial alignment with the direction of movement of the tooth from and towards the seat.

Preferably, the pin is mounted on the first region of the support head.

Preferably, the movement of the pin is controlled by the control member.

In one embodiment, the pin abuts the actuator on the opposite side with respect to the tooth.

In this way, the movement of the pin towards the inside of the seat determines a similar movement of both the actuator and the tooth, so that the tooth abuts the attachment plate and locks it in the seat.

Preferably, the pin is threaded and may be moved inside the second region of the body by rotating the control member.

In one embodiment, the control member is a knob.

In one embodiment, the unlocking element of the safety device is movable towards an unlocking position, in which it causes the movement of the retaining device towards the second position.

Preferably, the unlocking element is formed by the end part of a rod, which rod extends inside the second region of the body except for such an end part which, on the contrary, projects from the body to allow the actuation thereof by a user.

Preferably, the unlocking element of the safety device may be moved along a direction substantially parallel to the longitudinal direction.

In one embodiment, the unlocking element of the safety device is positioned on a rear side of the body, where the rear side is defined as the side of the head facing the user when the head is in use.

In this way, the unlocking of the safety device may be carried out simply and quickly by the user.

Preferably, when viewing the body of the support head from the rear side, the first region is on the right side of the body, while the second region is on the left side.

In this way the user preferably operates the unlocking element of the safety device with their left hand, while with the right hand said user may comfortably hold the video/photographic equipment.

This configuration is particularly useful for all video/photographic equipment designed to be preferably grasped with the right hand. In this way, the release of the video/photographic equipment is carried out by acting with the left hand on the unlocking element, while the right hand may remain firmly holding on to the equipment.

In one embodiment, the safety device further comprises a transmission which connects the rod to the actuator, so that by moving the unlocking element towards the unlocking position, the actuator is moved so as to bring the retaining device into the second position.

BRIEF DESCRIPTION OF THE DRAWINGS

The features and the advantages of the present invention will become more apparent from the detailed description of a preferred embodiment thereof illustrated, by way of non-limiting example, with reference to the accompanying drawings, in which:

FIG. 3 is a perspective view from a different angle of the portion of the support head of FIG. 2, FIG. 4 is a bottom view of the portion of the support head of FIG. 2 deprived of some components, to better highlight some operating mechanisms of the support head, FIG. 5 is a top view of the portion of the support head of FIG. 4 deprived of some further components, FIG. 6 is a perspective view of a detail of the support head of FIG. 2.

PREFERRED EMBODIMENT OF THE INVENTION

Figure 1:
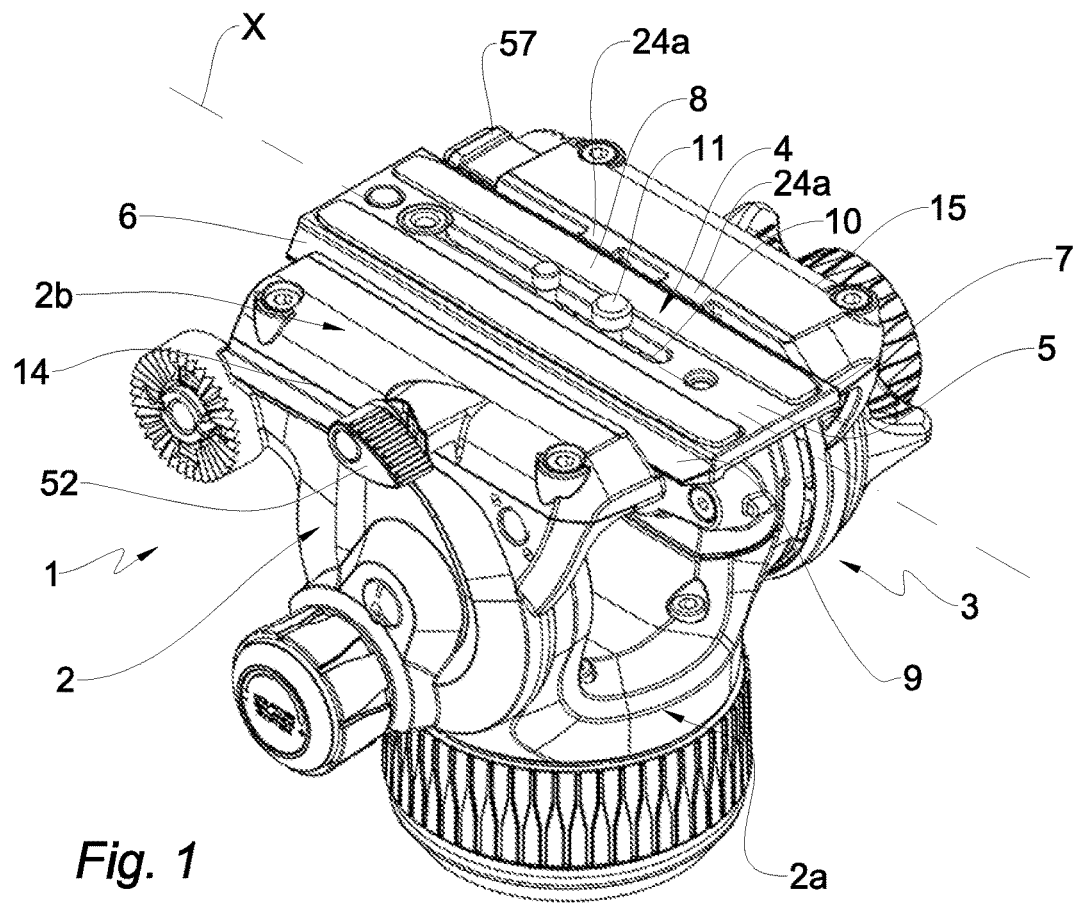
FIG. 1 is a top and front perspective view of an attachment system for video/photographic equipment made in accordance with the present invention, representing a support head shown in a first position in which it retains an attachment plate of the video/photographic equipment in engagement.

With reference to the accompanying figures, reference numeral 1 generally indicates an attachment system between video/photographic equipment, conventional in itself and not shown in the accompanying figures, and a support head 3 made in accordance with the present invention.

The attachment system 1 comprises an attachment plate 4 which may be removably fixed to a base of the video/photographic equipment. The attachment plate 4 comprises a central body 5 with a generally rectangular and substantially flat shape, mainly extending along a longitudinal axis X. The central body 5 is longitudinally delimited by a first and a second flank, respectively marked with 6 and 7, projecting from opposite sides to a surface 8 defined on the central body 5 on which the equipment rests.

The first flank 6 may have a cantilever profile, with a lip 9 extended substantially parallel to the surface 8, in a lowered position and away from the central body 5.

The second flank 7 may have an inclined plane profile, diverging from the surface 8.

In the median part of the central body 5 of the attachment plate 4, a longitudinal slot 10 is also formed, in which a connecting pin 11 is slidingly engaged, capable of engaging with a corresponding seat provided at the base of the equipment, according to embodiment methods known per se in the industry.

The support head 3 comprises a body 2, in turn divided into a lower body 2a and an upper body 2b, which are integral with each other by means of suitable fixing screws.

Figure 2:
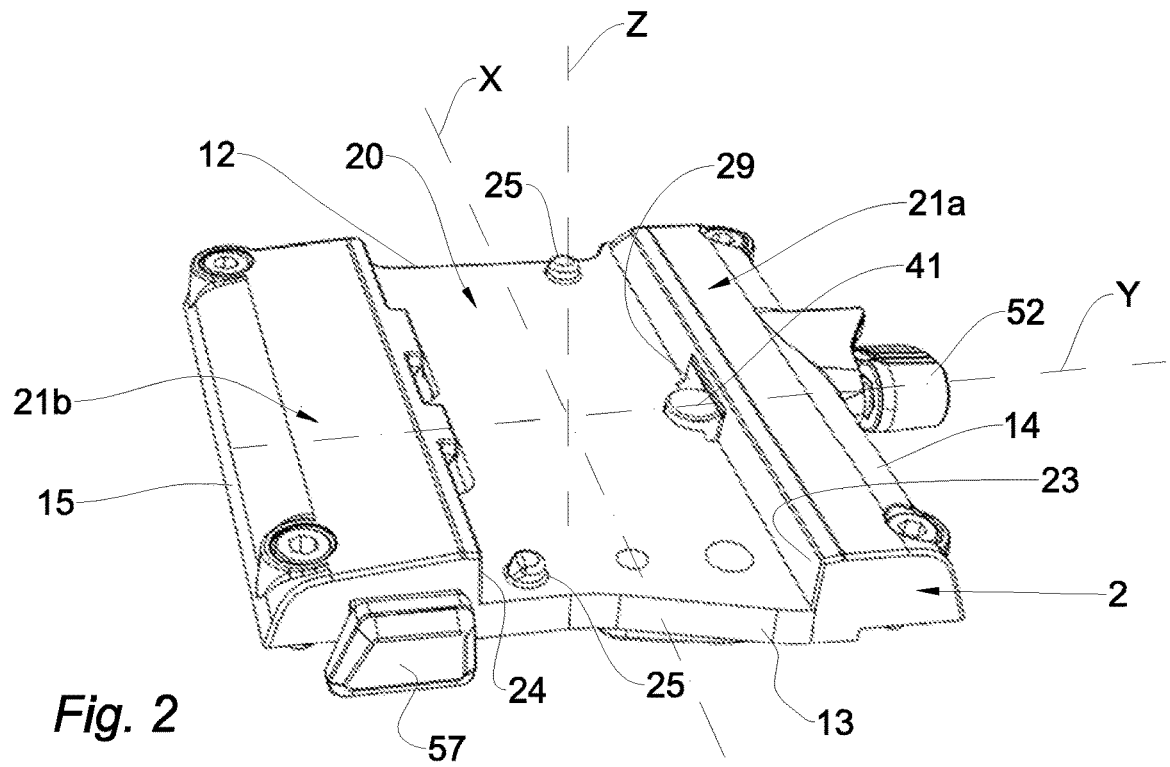
FIG. 2 is a top and rear perspective view of a portion of the support head of FIG. 1, in a second position in which it is not coupled to the attachment plate.

For greater clarity, in FIG. 2 and onwards, the support head 3 is shown showing only its upper body 2b.

On the body 2, a front side 12 is identified, defined as the side which the lens of the video/photographic equipment is intended to face, a rear side 13 is identified, opposite to the front side 12 and intended to be facing the operator when using the head 3, and a first flank 14 and a second flank 15 are identified extended laterally between the front side 12 and the rear side 13.

On the body 2, in particular on the top of the upper body 2b, a seat 20 is formed which is designed to accommodate the attachment plate 4 in engagement with the ability to slide along the longitudinal direction X.

For this purpose, the seat 20 comprises a bottom 22, forming a support surface of the attachment plate 4, which is open at the opposite longitudinal ends and is recessed between a first wall 23 and a second wall 24, substantially parallel to the longitudinal direction X, which laterally delimit the seat 20 for receiving and guiding the attachment plate 4.

The seat 20 divides the body 2 into a first region 21a and a second region 21b, extended on opposite sides with respect to the seat 20 and delimited respectively by the first flank 14 and the second flank 15.

Figure 7:
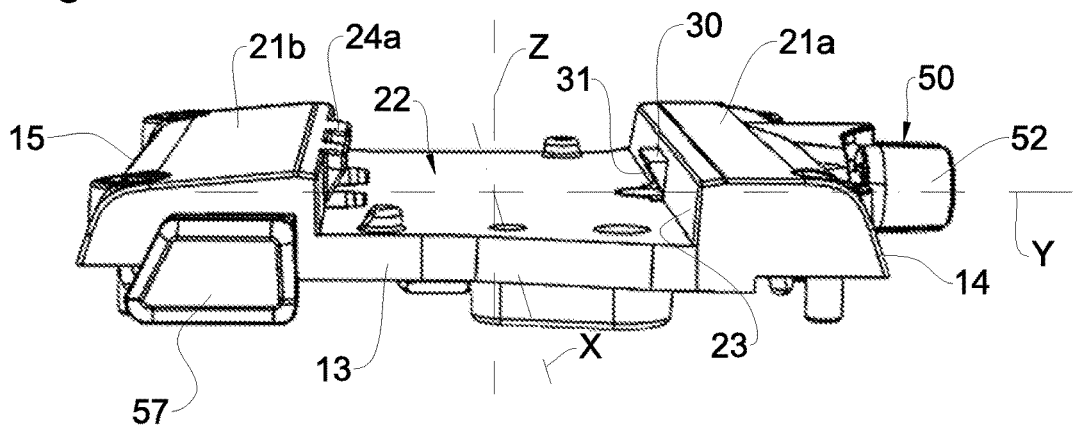
FIG. 7 is a top and rear perspective view of the portion of the support head of FIG. 2, in the first position shown in FIG. 1, but without the attachment plate.
Figure 8:
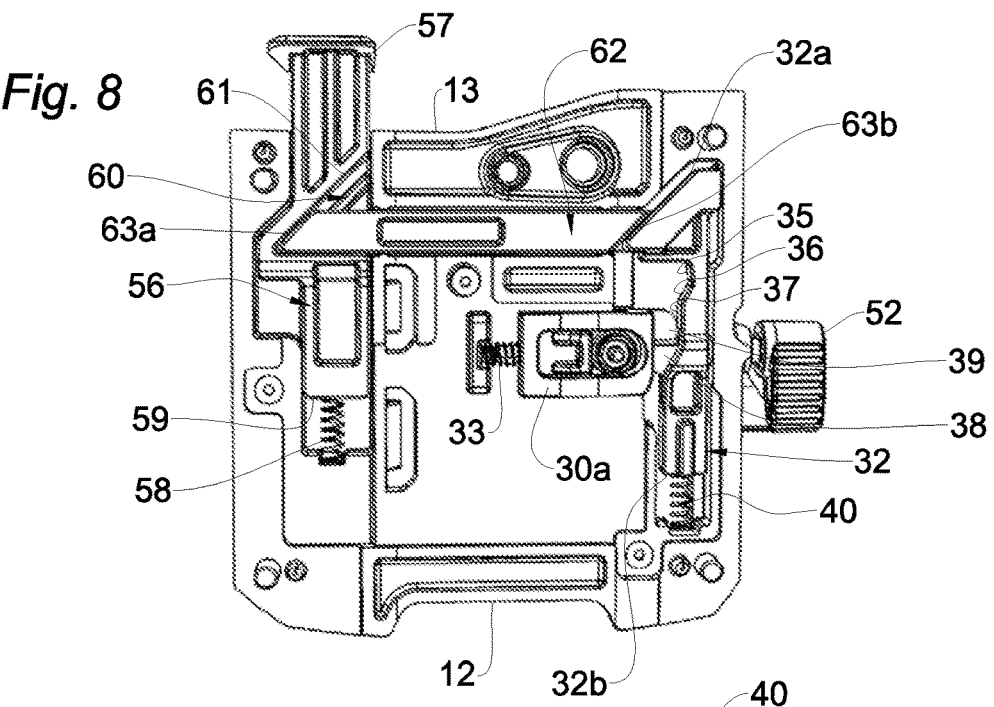
FIG. 8 is a view similar to FIG. 4, in which the support head is shown in the first position of FIG. 7.

Viewed from the rear side 13, the first region 21a is located to the right of the seat 20, while the second region 21b is located to the left of the seat 20 (see FIGS. 3 and 7).

To prevent the plate 4 from coming out of the longitudinal ends of the seat 20, suitable end stops are provided, including for example projections 25 erected from the bottom 22, which are capable of abutting the longitudinal edges of the attachment plate 4. It will be noted that in this way, the projections 25 remain hidden from view when the attachment plate 4 is coupled to the head 3.

The first wall 23 has a profile substantially perpendicular to the bottom 22.

The second wall 24 comprises a pair of appendages 24a which have an inclined profile with respect to the bottom 22, with which they form an acute angle, so as to match the course of the second flank 7 of the attachment plate 4.

The support head 3 also comprises a retaining device 28, designed to retain the attachment plate 4 in the seat 20 so as to have a limited ability to slide along the longitudinal direction X.

In particular, the retaining device 28 comprises a tooth 30, mounted at an opening 29 formed in the first wall 23. The tooth 30 may be moved in translation along a direction Y substantially perpendicular to the longitudinal direction X, in a manner substantially parallel to the bottom 22. In this way, the tooth 30 can protrude into the seat 20 by a desired extent, as described in more detail below.

The retaining device 28 is in fact movable between a first position, shown in FIGS. 1 and 7 to 9, in which the tooth 30 is extended inside the seat 20 to retain the attachment plate 4, and a second position, shown in FIGS. 2 to 6, in which the tooth 30 is slightly extended inside the seat 20 (in any case less extended than in the first position) or is outside the seat 20, so that the attachment plate 4 is free to enter or come out of the seat 20 along an insertion direction Z substantially perpendicular to the longitudinal direction X and to the bottom 22 of the seat 20.

The tooth 30 is erected from a base 30a, mounted with the ability to slide in the body 2, under the bottom 22, and comprises a wall 31 having an inclined profile projecting towards the inside of the seat 20, which forms an acute angle with the bottom 22 of the seat 20, substantially specular to the appendages 24a.

The tooth 30 may be moved along the direction Y between a retracted position, in which it is substantially flush with the first wall 23 (see FIG. 2), an intermediate position, in which it enters the seat 20 by a first extent (see FIG. 7), and a final position in which it enters the seat 20 by a second extent greater than the first extent.

In the retracted position, the tooth 30 does not hinder the insertion or the exit of the attachment plate 4 in the seat 20 along the insertion direction Z, and defines the second position of the retaining device 28.

In the intermediate position, the tooth 30 enters the seat 20 to such an extent as to prevent the attachment plate 4 from coming out of the seat 20 along the insertion direction Z. In fact, such a movement is prevented by the abutment of the inclined wall 31 of the tooth 30 against the lip 9 of the first flank 6. In this way, when the tooth 30 is in the intermediate position, the attachment plate 4 may only translate by a limited extent along the longitudinal direction X, thus defining the first position of the retaining device 28.

A further movement of the tooth 30 towards the centre of the seat 20 leads to the final position, where the tooth 30 pushes the attachment plate against the second wall 24 and the bottom 22, thus defining a locking position of the attachment plate 4 in the seat 20.

The retaining device 28 further comprises an actuator 32 suitably shaped for moving the tooth 30 from the retracted position to the intermediate position.

The actuator 32 is extended along a direction substantially parallel to the longitudinal direction X between a first end 32a thereof and a longitudinally opposite second end 32b thereof.

The actuator 32 is mounted in the first region 21a of the body 2 with the ability for limited translation along its longitudinal direction.

The actuator 32 abuts the tooth 30 on the opposite side to the seat 20, while a spring 33, active between the body 2 and the base 30a, urges the tooth 30 against a side edge 34 of the actuator 32 to ensure mutual contact thereof.

In this way, the movement of the tooth 30 along the direction Y may be advantageously determined by suitably defining the profile of the side edge 34 of the actuator 32.

For this purpose, in the region of the side edge 34 destined to abut the tooth 30, a recess 35, a ramp 36 inclined towards the seat 20, and a flat portion 37 are defined starting from the first end 32a towards the second end 32b, as well as a projection 38 extending towards the seat 20.

The flat portion 37 is substantially parallel to the longitudinal direction X and closer to the seat 20 than the recess 35, while the ramp 36 extends to connect the recess 35 and the flat portion 37.

In turn, the tooth 30 has a side 39a, opposite the inclined wall 31 and facing the actuator 32, from which an appendage 39 extends to abut the side edge 34 of the actuator 32.

The first end 32a of the actuator has an inclined profile, for example at 45°, and is separated from the recess 35 by a shoulder 35a.

Figure 9:
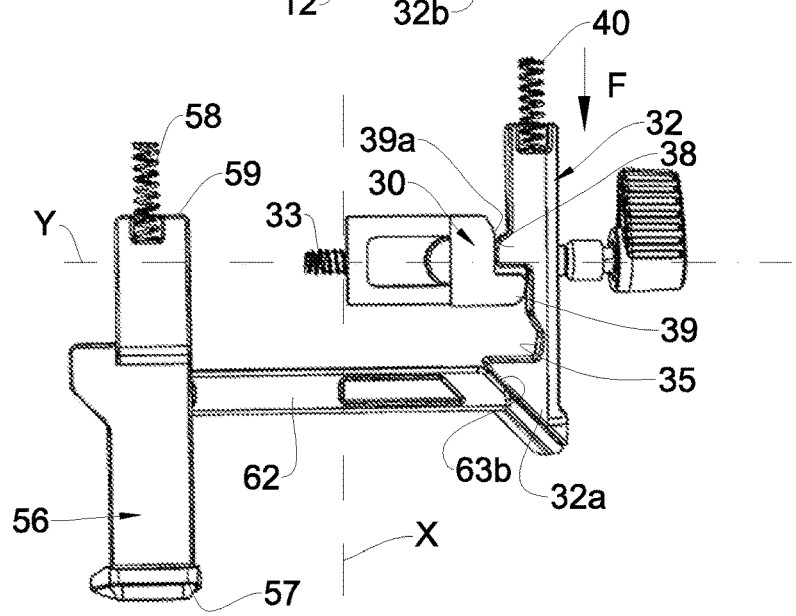
FIG. 9 is a view similar to FIG. 5, in which the support head is shown in the first position of FIG. 7.

On the second end 32b a spring 40 is active which urges the actuator 32 to move along its longitudinal direction in the direction defined by the first end 32a and indicated with F in FIG. 9.

The retaining device 28 also comprises a release element 41, substantially shaped like a button, which is located on the seat 20 in front of the tooth 30 and may be moved along a direction perpendicular to the bottom 22 between a position in which it projects from the bottom 22 to abut against the wall 31 of the tooth 30, locking the latter in its retracted position (FIGS. 2 to 6), and a position in which it is flush or lowered with respect to the bottom 22, thus allowing the movement of the tooth 30 towards its intermediate position (FIGS. 7 to 9) and towards its final locking position.

The release element 41 is urged by a spring 42 to project from the bottom 22.

The head 3 further comprises a locking device 50, provided to lock and to unlock the plate 4 inside the seat 20 in a desired position.

The locking device 50 comprises a pin 51, mounted on the first region 21a of the upper body 2b in substantial alignment with the tooth 30 along the direction Y.

The pin 51 is screwingly engaged on the upper body 2b, with the ability for translation with respect to same along the direction Y so as to abut the actuator 32 on the side opposite to the tooth 30 and move both the actuator 32 and the tooth 30 towards the inside the seat 20.

In particular, the movement of the pin 51 determines the movement of the tooth 30 from its intermediate position to its final position in which it locks the plate 4 against the second wall 24 and/or against the bottom 22 of the seat 20.

The locking device 50 also comprises a control member 52, preferably shaped like a knob, which may be operated by a user to control the screwing or unscrewing of the pin 51.

The control member 52 is fixed to the end of the pin 51 opposite to the actuator 32 and is therefore positioned on the first region 21a, so as to project from the first flank 14.

The support head 3 also comprises a safety device 55 designed to prevent accidental movement of the retaining device 28 from the first position, in which the attachment plate 4 is retained in the seat 20, to the second position, in which the attachment plate 4 may come out of the seat 20.

The safety device 55 comprises a rod 56 of which a predominant part extends inside the second region 21b of the upper body 2b, along a direction substantially parallel to the longitudinal direction X.

An end part 57 of the rod 56 instead projects from the rear side 13, and forms an element for unlocking the safety device 55 to allow the actuation thereof by the user.

The rod 56 is movable along its longitudinal direction between a locking position, in which the end part 57 is moved away from the rear side 13 of the body 2, and an unlocking position, in which the end part 57 is moved towards the rear side 13 of the body 2.

A spring 58, arranged between the body 2 and an end 59 of the rod 56 opposite to the end part 57, urges the rod 56 into the locking position.

In a median region of the rod 56 a seat 60 is formed, which is delimited by a guide wall 61 inclined with respect to the longitudinal direction of the rod 56, at an angle for example of approximately 45°.

Preferably, the guide wall 61 is substantially parallel to the first end 32a of the actuator 32.

The safety device 55 further comprises a transmission 62 extended between the seat 60 of the rod 56 and the first end 32a of the actuator 32. In particular, the transmission 62 abuts the guide wall 61 and the inclined profile of the first end 32a of the actuator 32 with its opposite ends 63a and 63b. The profile of the ends 63a and 63b is suitably inclined to match that of the guide wall 61 and of the first end 32a with which it is in contact.

The transmission 62 extends substantially parallel to the direction Y, so that the guide wall 61 is substantially aligned with the first end 32a of the actuator 32 with respect to such a direction.

The attachment system 1 operates in the manner described below.

In the configuration in which the attachment plate 4 is separated from the support head 3, the retaining device 28 is in the second position, shown in FIGS. 2 to 6.

In this position, the tooth 30 is in its retracted position, substantially flush with the first wall 23, with its appendage 39 partially received in the recess 35 of the actuator 32. The latter is moved towards the front side 12 of the body 2, compressing the spring 40.

The tooth 30 is retained in this position by the release element 41, which, projecting from the bottom 22, prevents it from moving towards the inside of the seat 20.

To attach video/photographic equipment to the support head 3, the attachment plate 4, fixed to the base of the equipment, is inserted into the seat 20 starting from the top, along the insertion direction Z, by first inserting the second flank 7 into the seat 20, under the appendages 24a of the second wall 24, and then inserting the first flank 6 in proximity to the first wall 23, bringing the base of the attachment plate 4 into contact with the bottom 22.

In this way, the attachment plate presses the release element 41 and moves it, against the action of the spring 42, to the level of the bottom 22, thereby unlocking the tooth 30.

The latter is then moved from the retracted position to the intermediate position by the movement of the actuator 32, which, due to the action of the spring 40, is moved towards the rear side 13 of the body 2, overcoming the action of the spring 33.

In particular, the movement of the tooth 30 along the direction Y is caused by the fact that the appendage 39 passes from contact with the recess 35 to contact with the flat portion 37, closest to the seat 20, via the inclined ramp 36.

The movement of the actuator 32 also determines the movement of the transmission 62 towards the second flank 15 of the body 2, while the rod 56 is moved towards the rear side 13 of the body 2 by the spring 58.

The movement of the actuator 32 is limited by the abutment of the appendage 39 of the tooth against the projection 38 formed on the side edge 34 of the actuator 32.

The tooth 30 is therefore in the intermediate position and the retaining device 28 in the first position. The attachment plate 4 may not come out of the seat 20 along the insertion direction Z, but it may be easily moved along the longitudinal direction X to be brought into the position which allows the correct balancing of the system. This movement is however limited by the projections 25 which, acting as end stop elements, prevent the attachment plate 4 from coming out of the longitudinal ends of the seat 20.

Once the correct position of the attachment plate 4 has been found in the seat 20, the pin 51 is screwed by acting on the control member 52, moving the tooth 30 into its final position where it locks the attachment plate 4 against the second wall 24 or against the bottom 22.

To unlock the attachment plate 4, it is sufficient to loosen the pin 51 by rotating the control member 52 in the opposite direction. However, the attachment plate cannot yet come out of the seat 20 because the movement of the tooth 30 towards the retracted position is prevented by the contact of its appendage 39 with the flat portion 37 of the actuator 32.

To disengage the attachment plate 4 from the support head 3, it is necessary to press the end part 57 of the rod 56 against the rear side 13 of the body, overcoming the action of the spring 58.

Due to the conformation of the ends 63a and 63b of the transmission 62, the guide wall 61 and the first end 32a of the actuator 32, the movement of the rod 56 towards the front side 12 of the body 2 determines the movement of the transmission 62 along the direction Y towards the first flank 14 and the consequent movement of the actuator 32 towards the front side 12 of the body 2, against the action of the spring 40.

As a consequence of the movement of the actuator 32, the appendage 39 of the tooth 30 is located at the recess 35 and, due to the action of the spring 33, pushed inside it, thus determining the movement of the tooth 30 into its retracted position. The movement of the actuator 32 is also limited by the abutment of the shoulder 35a against the appendage 39 of the tooth 30.

The attachment plate 4 may therefore be conveniently extracted from the seat 20 along the insertion direction Z, so that the release element 41, pushed by the spring 42, may project from the bottom 22 and lock the tooth 30 in the retracted position.

It will be noted that the actuation of the unlocking element, i.e. the pressure of the end part 57 of the rod 56, may be carried out by the user with their left hand, while with the right hand said user may in any case maintain their grip on the video/photographic equipment, preventing said equipment from possible accidental falls once released from the support head 3.

The present invention therefore solves the drawbacks described above with reference to the prior art.

The invention claimed is:

1. A support head for video/photographic equipment, comprising:
    a body on which a seat is formed, said seat is provided to receive an attachment plate of said video/photographic equipment, said body defines a first region and a second region, and said first region and said second region are separated by said seat,
    a retaining device movable between a first position, in which said retaining device extends into said seat in order to retain said attachment plate in said seat so as to provide said attachment plate with a limited ability to slide in a longitudinal direction defined on said seat, and a second position, in which said retaining device is outside said seat or extends into said seat by an extent smaller than when in said first position, such that said attachment plate is free to enter or come out of said seat along an axis substantially perpendicular to said longitudinal direction,
    a locking device which is provided to lock and to unlock said attachment plate inside said seat in a desired position,
    a control member of said locking device, said control member is positioned on said first region of said body and is configured to be actuated by a user in order to control said locking device, a safety device which is provided to prevent said retaining device from accidentally moving from said first position to said second position, an unlocking element of said safety device, said unlocking element is configured to be actuated by said user in order to unlock said safety device and allow said retaining device to move from said first position to said second position, wherein said unlocking element of said safety device is positioned on said second region of said body.

2. The support head according to claim 1, wherein said seat is laterally delimited by a first wall and by a second wall which are substantially parallel to said longitudinal direction, and said retaining device comprises a tooth mounted on said first wall so as to be able to move from and towards an inside of said seat when said retaining device is moved between said first position and said second position.

3. The support head according to claim 2, wherein said retaining device comprises an actuator which is mounted so as to be able to move with respect to said body and shaped in order to move said tooth at least when said retaining device is moved between said second position and said first position.

4. The support head according to claim 3, wherein a recess is formed on said actuator, said recess is intended for receiving said tooth when said retaining device is moved into said second position.

5. The support head according to claim 2, wherein said retaining device comprises a release element which is configured to be moved between a position in which said release element locks said tooth in said second position and a position in which said release element allows said tooth to move towards said first position.

6. The support head according to claim 5, wherein, when said retaining device is in said second position, said release element projects from a bottom of said seat so as to abut said tooth.

7. The support head according to claim 1, wherein said retaining device is resiliently urged in said first position.

8. The support head according to claim 1, wherein said locking device comprises a pin which is configured to be moved with respect to said body in order to move said retaining device from said first position towards an inside of said seat so as to lock said attachment plate in said seat.

9. The support head according to claim 1, wherein said unlocking element of said safety device is configured to be moved towards an unlocking position in which said unlocking element moves said retaining device towards said second position.

10. The support head according to claim 1, wherein said unlocking element of said safety device is positioned on a rear side of said body, said rear side configured to face said user when said support head is in use.

11. An attachment system for video/photographic equipment, comprising:
    an attachment plate which is configured to be fixed to a base of said video/photographic equipment, and
    a support head according to claim 1, wherein said seat of said body of said support head is configured to receive said attachment plate.

* * * * *